Aug. 7, 1945.   J. H. GREEN   2,381,586
TESTING APPARATUS
Filed Aug. 20, 1941   3 Sheets-Sheet 1
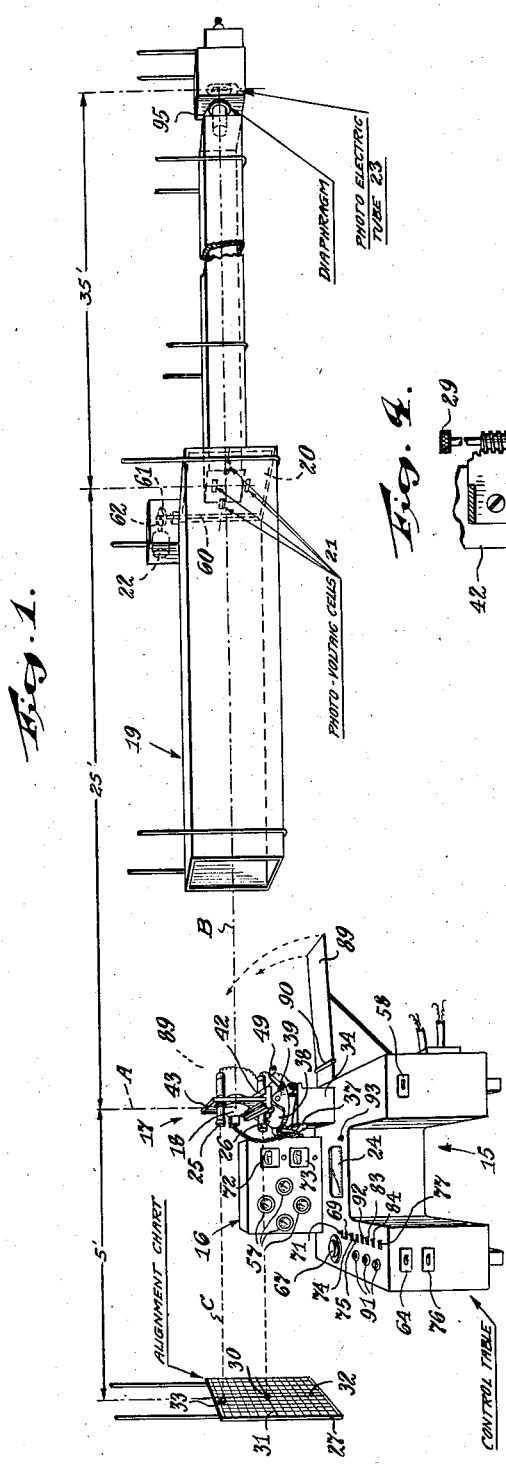
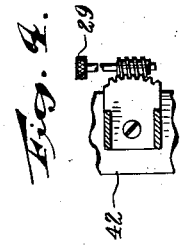
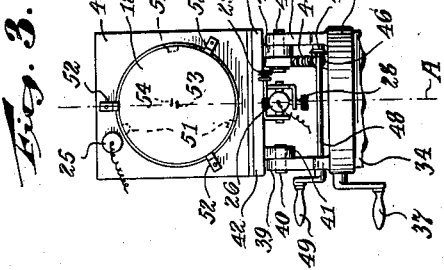
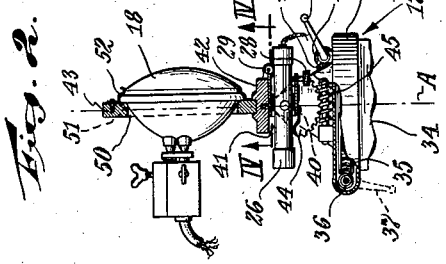
INVENTOR
J. H. GREEN
BY
ATTORNEY Aug. 7, 1945.   J. H. GREEN   2,381,586
TESTING APPARATUS
Filed Aug. 20, 1941   3 Sheets-Sheet 2
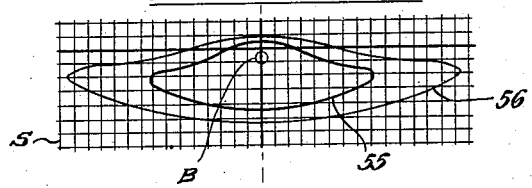
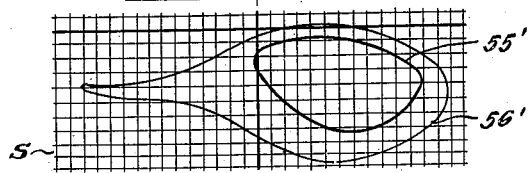
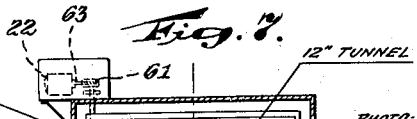
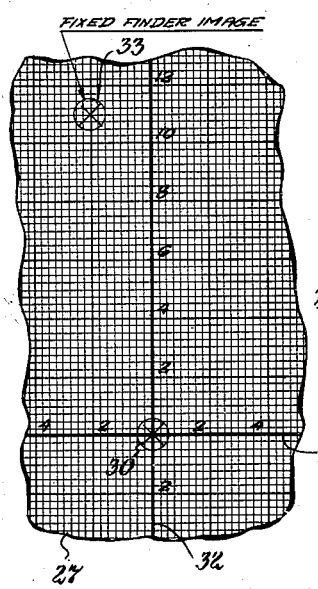
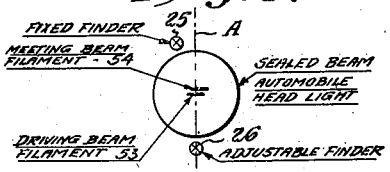
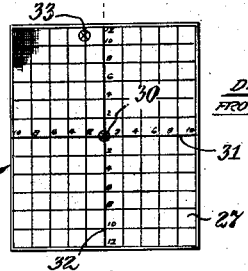
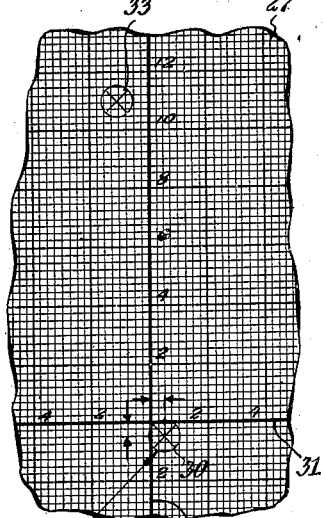
INVENTOR
J. H. GREEN
BY J. H. Green
ATTORNEY Patented Aug. 7, 1945

2,381,586

UNITED STATES PATENT OFFICE 2,381,586

TESTING APPARATUS

James H. Green, West Orange, N. J., assignor to Westinghouse Electric Corporation, East Pittsburgh, Pa., a corporation of Pennsylvania Application August 20, 1941, Serial No. 407,572

10 Claims. (Cl. 88—14)

This invention relates to testing apparatus and more particularly to apparatus for testing characteristics of light beams of headlights and the like, and has specific reference to testing characteristics of the light beams of headlights wherein one or more filaments are within a lamp body formed by a reflector back portion and a lens front portion vacuum sealed together and forming an evacuated envelope as well as a directional lamp or headlight.

Lamps of the character indicated are used in the automotive art as headlights, and must, therefore have characteristics such as current consumption, candle power, beam direction, beam concentration and so forth within acceptable limits. Since the filaments are mounted directly within the reflector portion of the headlight and the lens is sealed to the reflector portion, the user has no control over adjustments which were available to him in prior art headlights using movable bulbs therein, but must use the light as furnished to him. It accordingly is essential that the manufacturer carry out definite systematic tests upon the completed or substantially completed headlight that those sold shall come up to standard and be acceptable for use. Time consumed in making such tests should not be excessive and yet accuracy and dependability of test must not be lessened.

An object of the present invention is to provide a means of accurately evaluating the output of "sealed beam" headlights.

Also an object of the present invention is to provide a means of determining the light pattern and distribution as a result of lens design.

Again, an object of the present invention is to provide a testing apparatus which will enable a headlight to be placed therein and tested for all electrical and light characteristics from the single placement and by one operator.

Another object of the present invention is to provide a testing apparatus which places all controls convenient to manipulation by an operator seated at a control desk and all instruments to be read within convenient reading distance and at convenient reading positions.

A further object of the present invention is to provide a testing apparatus which multiplies the erroneous characteristics of the headlight being tested in the visual indication thereof to the operator.

A still further object of the present invention is to provide a testing apparatus which involves only simple movements and operations on the part of the operator to reduce fatigue of the operator and promote accuracy of test.

Still further objects of the invention will appear to those skilled in the art as the description progresses, both by direct statement thereof and by implication from the context.

In the accompanying drawings, wherein like numerals of reference indicate similar parts throughout the several views, and wherein a preferred physical embodiment of the invention is disclosed by way of example;

Figure 1 is a perspective view of a testing apparatus in accordance with the present invention;

Figure 1a is a sectional view of the portion of the tunnel at which the light pattern of the headlight is made effective on testing apparatus;

Figure 2 is a sectional-elevation of the headlight supporting turret, with a headlight mounted in place therein for test;

Figure 3 is a front view of the turret and headlight of Fig. 2;

Figure 4 is an underneath sectional view on line IV—IV of Fig. 2, showing the micrometer adjustment for the movable finder or spotlight;

Figures 5 and 6 are graph showings of ideal useful beam patterns for driving and meeting beams respectively;

Figure 7 is a cross-sectional view of the tunnel looking in the direction of travel of the light thereinto;

Figure 8 is a diagrammatic face view of the relation of headlight filaments and finder lights of the testing apparatus;

Figures 9, 10 and 11 are face views of the alignment chart; and

Figure 12:
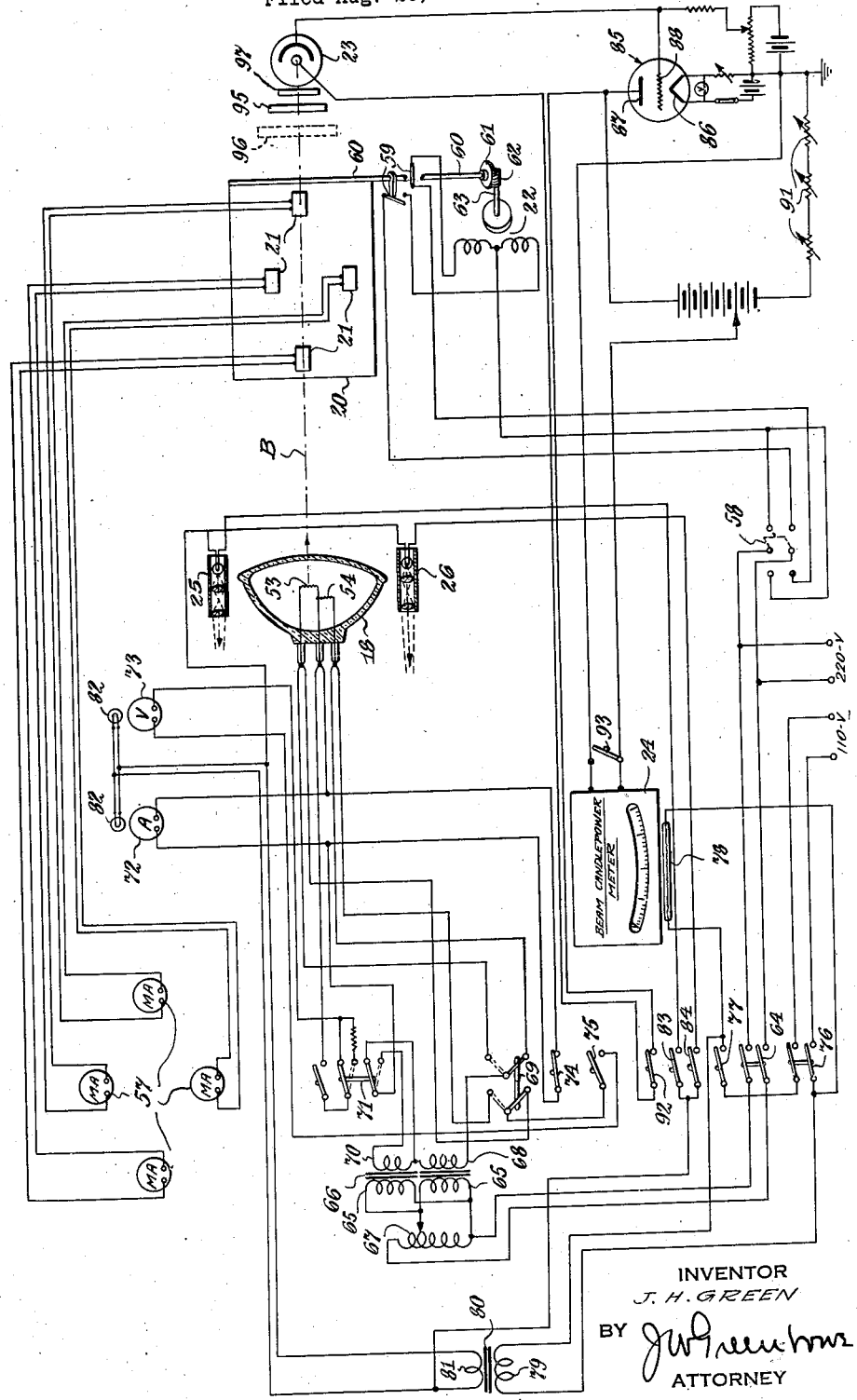
Figure 12 is a wiring diagram for the testing apparatus.

In its more general aspects, the apparatus provides a desk or table 15 at which the operator is seated while engaged in the testing operations. At the back of the desk, substantially in front of the operator, is an instrument board 16 to the right of which is a turret 17 for retaining and manipulating a headlight 18 being tested. The headlight is situated for test purposes to shine its beam to the right of the operator into a tunnel 19. At an exact distance, such as twenty-five feet from the headlight, said tunnel is provided with a gate or the like 20 carrying light-responsive cells 21 for the determination of the light distribution and pattern. The acceptable useful light distribution will be referred to herein as the useful beam for purposes of distinguishing that somewhat spread area of light from the "hot spot" or concentrated beam of maximum intensity within the area. The useful beam has a spread or distribution such that it will simultaneously affect the several cells 21 situated at distances apart on the front of the gate. Said gate is equipped with a motor 22 or other means for moving it from the light path to permit the concentrated light beam to then continue, for example, another thirty-five feet, through the far section of the tunnel to a light-responsive device or photoelectric cell 23 for indicating the concentrated beam candle power on a microammeter 24 in the desk top immediately in front of the operator.

The turret 17 is equipped with two projection spot lights or finders 25, 26 both of which direct their beams in a direction to the rear of the headlight being tested. The finders or spot lights project an image of a cross, like an X, for instance, upon a fixed alignment chart 27 here shown five feet from the light center of the lamp to the left of the operator. The distance of the chart from the finders or spot lights will magnify the deviation of either beam from normal position, and the chart is preferably situated and cross-lined to show a sixteenth of a degree movement of the finder spot light beam when said beam moves from one line to the next, Figures 10 and 11.

Assuming a perfect headlight has been mounted in turret 17, then its concentrated beam will strike the photo-electric tube 23 at the far end of the tunnel and the projection or finder spot light beams will register on the chart 27 at their respective zero points. Theoretically, their beams will be parallel to the concentrated beam of the head light. Now one of the finders, as the upper one 25, is fixed with respect to the turret, whereas the other finder 26 is adjustable with a verical swing by a knurled-nut micrometer adjustment 28 and a horizontal swing by a knurled nut 29, details of all of which will be hereinafter more fully described.

Assuming now that the head light is not perfect, but that its concentrated beam deviates one-half degree upwardly and one-half degree to the left, then the spot-lights from finders 25, 26 will not hit their zero locations when the head light beam is made to go straight in the tunnel. The deviation may accordingly be read from the alignment chart. In practice, it is found best to have the normal zero focal point for the lower finder upon the vertex 30 of crossing zero ordinate 31 and zero abscissa 32 which extend horizontally and vertically, respectively, each at the middle of the chart. It is from this vertex or zero focal point that readings are taken as to departure of beam direction and so forth. As will be noted hereinafter, the head carrying the finder lights may tilt, and it is accordingly preferable to concave the horizontally disposed lines above and below the zero ordinate 31 to compensate for such tilting in reading the beam projection.

The zero focal point 33 for the upper finder 25, that is, the spot light or finder which is fixed with respect to the turret, is permanently located at the proper spot on the chart to register with the light from the said finder when a perfect head light mounted in the turret has its concentrated beam accurately focused on the photo-electric tube 23 at the far end of the tunnel. In the set-up illustrated, the said zero point 33 is several blocks above the zero ordinate 31, and to the left of the zero abscissa 32. The point is shown defined by an X mark, but other modes of designation for rendering it readily visible and quickly located by the operator may be employed. When once this zero focal point 33 has been established in setting up the apparatus, and marked on the chart, it remains constant for the apparatus thereafter.

It will now be appropriate to consider more in detail the construction and operation of the turret. A fixed base 34 is provided for the turret on desk or table 15. Horizontally and non-rotatably situated above said base on a vertical axis A, is a fixed worm wheel 35 which has a worm 36 in mesh therewith. The worm is on a horizontal axis directed toward the operator, and has a crank 37 on the near end thereof for manipulation by the operator. The worm and crank are mounted in an apron like turntable 38 which is rotatable axially with respect to said axis A and worm wheel. Since the worm wheel is fixed, operation of the worm revolves the turntable in a horizontal plane. Fast on the top of the turntable are a pair of spaced stanchions 39 situated at diametrically opposite edges thereof in parallel relation to each other and having alined holes therein for receiving pivot pins 40 which project inwardly toward each other. Lugs 41, 41 are mounted on said inwardly projecting ends of pivot pins 40, said lugs being integral with and depending from the foot portion 42 of a teeter head comprising said foot portion and an upstanding plate-like bracket portion 43 the plane of which, when vertical, includes axis A and the line of pivoting of said teeter head.

Teetering of said head is under control of a gear segment 44 depending from and fast with respect to said foot portion 42. Below and in mesh with the cogs of the gear segment is a worm 45 carried in suitable bearing lugs projecting upwardly from turntable 38. At one end of this worm 45 is shown a bevel gear 46 in mesh with a companion bevel gear 47 fast upon a crank shaft 48 having mounting lugs from the turntable and having a crank 49 at its end toward the operator. The construction enables the head to fulcrum on pins 40, 40 under a delicate control and be held in the teetered or other position against gravitational influence by the interlocking effect of the worm gear segment and worm.

Bracket portion 43 is centrally apertured at 50 and socketed to receive and retain the headlight being tested. The socketing includes provision of notches next the aperture for receiving ears 51 on the rim of the headlight by which the said headlight is retained both in said bracket and in use in a fixed or non-rotative position. Clips 52 for engaging the front of the headlight rim are to be considered as part of the socketing construction for mounting said headlight in the testing apparatus. When the said headlight is thus mounted, if it is a perfect lamp, its filament will project its concentrated beam line B theoretically parallel to the projection beam line C of finder 25 fixed with respect to said bracket.

It may be observed at this time that the headlight has two filaments therein, of which one, designated by numeral 53, Figure 8, is centrally disposed and constitutes the main filament for the major beam or driving light output, whereas the other or auxiliary filament 54 is above and slightly off-set clockwise from the main filament for what is known in use as the minor beam or meeting light. When the headlight is mounted in the bracket, vertical axis A of the turret substantially intersects the filaments, wherefore it may be said that turret axis A and concentrated beam line B are, for a perfect lamp, intersecting and at substantially right angles, and define the vertical plane of the light pattern. The light pattern of a perfect headlight projected upon a screen S will appear, for the driving light output, as shown in Fig. 5 and for the meeting light as shown in Fig. 6. The inner closed configuration 55 shows the useful beam or area of projected light of intensity acceptable for driving purposes. The concentrated beam is not at the geometric center of this area, but is near the top and center thereof approximately at B on the shaft. The area beyond configuration 55 and within configuration 56 represents corona rays, that is stray light of an intensity useful for the illumination of objects but of less intensity than that which will be objectionable to an on-coming driver in direct line thereof. In Figure 6, the closed configurations 55' and 56' are the corresponding light projections for the meeting light of a perfect headlight.

Projection of the light output into the tunnel with gate 20 standing across the light path impinges the light near the top, bottom and sides or ends of the light pattern upon the four cells 21 situated in those relative positions. It may be now noted that since the purpose of a headlight is to illuminate the road in use, the forward slightly diverging progress of the light pattern has a downward trend and at the distance of the gate from the headlight the light-responsive devices or cells, while symmetrically disposed with respect to each other, are centered below the direct or horizontal concentrated beam line B which is preferably at the geometric axis of the tunnel. A part of the gate is interposed in the path of the concentrated beam, so while the gate is closed, the concentrated beam does not pass through to the far end of the tunnel. Each cell 21 on the gate produces a variable current when energized by light proportionate to the light intensity, and is wired to a corresponding meter 57 on the instrument board 16, enabling the operator to center the light pattern for balanced distribution of light on the four cells, by an appropriate manipulation of cranks 37 and 49. By use of knurled nut micrometer adjustments 28 and 29, the adjustable finder is then focused back to its zero point 30. Then the cranks are again manipulated to bring the upper finder light 25 back to coincidence with its zero X-mark 33 on the chart which simultaneously displaces the projection of the lower finder light on the chart, as indicated in Figure 11, thereby giving a departure reading. This transfer of departure from the upper finder light to the lower one is both for convenience and accuracy, because the curvature of the upper abscissa can only be made to give correct readings from a single finder, namely the lower one 26. Since the chart is at the rear of the headlight, displacement of the finder beam on the chart shown as to the right and downward from zero position in Fig. 11, indicates the light pattern of the headlight has a departure to the left and upwardly from normal. The particular recording entered on the operator's record sheet from the position thus shown on the chart would be ½°U, ½°L, the letters designating up and left respectively and the figures designating degrees of departure of the light pattern from normal or perfect position.

The departure recording having been entered, the operator next operates motor 22 and thereby swings gate 20 to one side. As shown, the motor is controlled by a reversing or double throw switch 58 conveniently situated at the front of desk 15, the gate having double acting throw-out switches 59, 59 cooperating with said switch 58 to stop the motor at each ultimate position of its amplitude of swing at fully opened and fully closed condition. These said throw-out switches 59 are shown as cam controlled by rotation of the hinge-shaft mounting 60 for the gate but may be relay or mercury switch controlled. As an operative means, a worm wheel 61 is shown on the hinge-shaft in mesh with a worm 62 on the armature shaft 63 of the motor.

With the gate 20 swung back, the operator again manipulates cranks 37 and 49 to locate the turret head in such position that the concentrated beam of the headlight impinges on the photo-electric cell 23 at the far end of the tunnel, and takes a reading on the microammeter 24 for maximum candle power, and a reading from the chart 27 as to deviation from the zero position of the lower finder beam. Other desired readings may also be made, such as maximum and minimum candle power ascertainable by exploring within a range of one or more degrees each way, that is, right, left, up and down from the position of maximum candle power. Similar explorations and recordings made with respect to the driving light filament may be made with respect to the passing light filament.

Appropriate wiring connections and apparatus may be utilized for affording the proper current supply, control and indication. The diagram of Figure 12 indicates employment of 220 volt supply feeding through switch 58 to motor 22, and feeding through a switch 64 to primaries 65 of a transformer 66 as well as through a Variac or resistance controller 67. The transformer provides a secondary 68 furnishing approximately 6 volt potential to either lamp filament through a double throw switch 69. Another secondary 70 operating through a multiple point switch 71 provides for furnishing current at substantially 12 volts, thus enabling headlights of either voltage to be tested. Proper connections are made from these 6 volt and 12 volt secondaries to an ammeter 72 and a voltmeter 73 both of which are on the instrument board. A switch 74 is provided in the line to the ammeter, and a switch 75 is provided in the line to the voltmeter.

A source of 110 volts potential is provided for illumination and for the finder lights. This line is controlled by a main double pole switch 76 and other switches as desired. For instance, this line is also shown feeding through a single pole switch 77 on the desk top to a 110 volt 6 w. fluorescent lamp 78 for the microammeter 24 as well as to the primary 79 of a transformer 80 having a secondary 81. From the secondary are provided connections to illuminating bulbs or lamps 82 for the ammeter and voltmeter, and, through switches 83, 84 to the two finder spotlights 25, 26.

The light-responsive cell 23 at the far end of the tunnel is preferably a WL770 caesium magnesium vacuum cell with which is associated a 201A top grid amplifier electron discharge tube 85 shown with cathode 86, anode 87 and grid 88 and appropriate batteries or rectified power supply, switch and adjustments for delivering desired output to the microammeter 24. The adjustments enable the pointer of the meter to be brought to zero position at any period desired of the testing procedure, and to avoid necessity of turning off the headlight current when making the adjustment of the meter, a blinder 89 is hinged at 90 next the turret base 34. The blinder may be swung upward in front of the headlight at any time and intercepts the light thereof so the light-responsive cell will be in darkness, at which time the meter reading should be zero. The operator may conveniently make this periodic adjustment by manipulation of variable resistors 91. A switch 92 may be provided to control the circuit from the cell 23 to amplifier 85, and a switch 93 for the microammeter.

It may be further noted that the light to the light-responsive cell 23 is caused to pass through a number of baffles 94 located at suitable distances along the length of the tunnel and an iris 95 immediately in front of the cell, so the cell will be affected by a restricted beam and thus assure accurate indication of light intensity of direct rays only.

For purposes of calibration, a standard lamp is used in the headlight of approximately 30,000 candle power. At the cell end of the tunnel filter screens are successively inserted, at 96, which will pass values of substantially 75%, 50% and 5% of total light output. There is an additional color filter 97 which, together with the WL770 photocell employed at the far end of the tunnel, enables resultant readings to be taken which will express the output of the lamp in terms of the eye sensitivity curve. The screens are not present during testing of headlights, and adjustment of the microammeter to zero as above explained will theoretically make proper adjustment over the whole range. An occasional test with the calibrating screens may be taken, however, to correct, if necessary, any variations resulting from battery or tube fatigue or other causes.

Since the various details of construction as well as the precise steps in the described procedure and method of testing are subject to variation and change without departing from the inventive concept or scope of the invention, it is intended that all matter contained in the specification or illustrated in the drawings shall be interpreted as exemplary and not in a limiting sense.

I claim:

1. A testing apparatus for headlights, comprising supporting means for mounting the headlight fixed with respect thereto and movable by moving the supporting means, a tunnel into which the beam of the headlight is directed, a light-responsive means at the far end of the tunnel, a gate partway of the length of the tunnel movable into and out of the path of the light beam, and other light-responsive means on said gate offset from the normal path of greatest intensity of light beam for obtaining a balance of light pattern in the tunnel, each of said light-responsive means having a meter connected therewith.

2. A testing apparatus for headlights, comprising a desk having an instrument board at its rear and a turret next thereto having means for mounting a headlight, a tunnel at one side of the desk for receiving light from said headlight, a fixed chart at the other side of said desk from said turret and headlight, finder lights on the turret directed toward said chart for indicating position of the turret when the headlight beam is directed in normal path into the tunnel for enabling the turret to be set to proper position, light-responsive means in said tunnel in the normal path of light beam in the tunnel, switches on the desk for controlling circuits to the headlight, finders and light-responsive means, and meters on the desk and instrument board for indicating current and voltage of the light-responsive means and of the headlight.

3. A testing apparatus for headlights, comprising as a continuing part of said apparatus for all headlights to be tested thereby, a turret having a normal straight-forward position for supporting in a normal straight-forward position a headlight to be tested, said turret being movable with the headlight from straight-forward normal position for a headlight the beam of which deviates from proper forward path, said turret having a finder light carried thereby, means for locating direction of the headlight beam in its proper forward path by altering the straight-forward normal position of said turret and headlight, and means for indicating by deviation of the beam of the finder light the deviation of headlight beam from straight-forward normal position of the headlight.

4. A testing apparatus for headlights, comprising as a continuing part of said apparatus for all headlights to be tested thereby, a turret having means for mounting the headlight fixed with respect thereto with said turret and headlight both in a straight-forward normal position, said headlight and turret being movable from straight-forward normal position for a headlight the beam of which deviates from proper forward path, and both said headlight and turret being movable by moving the said turret, said turret having a finder light fixed with respect thereto, and a fixed chart for indicating by deviation of the beam of the finder light on said chart the angular displacement from normal straight-forward position of the turret and the deviation of the headlight beam from normal straight-forward position of the headlight.

5. A testing apparatus for headlights, comprising supporting means for mounting the headlight fixed with respect thereto with said means and headlight both in a straight-forward normal position, said headlight and means being movable from straight-forward normal position for a headlight the beam of which deviates from proper forward path, and both said headlight and supporting means being movable by moving the said supporting means to an out-of-normal position, said supporting means having a finder light fixed with respect thereto and having another finder light movable with respect thereto, and a chart for indicating relative positions of the light from said finders, the chart having zero positions for each finder light by which the movable finder light may be brought to its zero position on the chart when the light beam of the headlight is in straight-forward position and the difference of reading of one finder light from zero position while the other is on its zero position thereby giving a reading of deviation of the headlight beam from normal straight-forward projection from the headlight.

6. A testing apparatus for headlights, comprising a movable head for temporarily and removably receiving and holding a headlight to be tested in straight-forward normal position with respect to said movable head, said head being movable angularly with the headlight from straight-forward position of the head for a headlight the beam of which deviates from proper forward path, a tunnel in front of said headlight, said tunnel having light-responsive means by which the headlight may be directed with its beam in predetermined relation to the axis of the tunnel, and means at the rear of the headlight for visually magnifying angular displacement of the head from normal straightforward position and departure of the headlight beam from correct line of projection from the headlight.

7. A testing apparatus for headlights, comprising means for temporarily and removably supporting a headlight to be tested in a straightforward normal position with respect to said supporting means, said means being movable with the headlight from straight-forward normal position for a headlight the beam of which deviates from proper forward path, a tunnel into which the beam of the headlight is directed, a plurality of light-responsive means in said tunnel to which the light beam may be directed said light-responsive means being substantially equally offset from the normal path of greatest intensity of the light beam enabling the light effect of said beam thereon to be balanced with respect to the plurality of light-responsive means and means for visually magnifying angular displacement of the supporting means from normal straight-forward position and departure of the headlight beam from correct line of projection from the headlight when said beam is positioned to balance light effect on said light-responsive means.

8. A method of testing a headlight having means for projecting a light beam the path whereof is intended to be straight forward from the headlight and coincident with the axis of the headlight but which may deviate from such path and coincidence, which comprises directing the headlight with its axis centralized with respect to a light responsive means, thereafter directing two finder lights onto a chart to establish zero positions for said finder lights, and simultaneously moving the headlight and finder lights as a unit to direct the headlight beam on a path centralizing the axis of said beam with respect to the light-responsive means, returning one of the finder lights to its zero position while maintaining the headlight beam on said centralized path, moving both finder lights as a unit simultaneously to bring the other one to its zero position and thereby move the first one away from its zero position, and determining deviation of the headlight beam from straight-forward path from the headlight by reading from the chart the distance from zero of the last-mentioned finder light.

9. A testing apparatus for headlights, comprising supporting means for temporarily and removably mounting a headlight to be tested fixed with respect thereto and movable by moving the supporting means, a tunnel into which the beam of the headlight is directed, a beam-intensity light-responsive means at the far end of the tunnel, a meter connected with said beam-intensity light-responsive means for indicating the intensity of light incident upon said beam-intensity light-responsive means, headlight beam pattern-locating light-responsive means in advance of said beam-intensity light-responsive means, said pattern-locating means comprising a plurality of light-responsive elements each offset from the path of the center of the headlight beam to the beam-intensity light-responsive means and arranged so that they receive equal quantities of light when the center of the beam is directed toward the beam-intensity light-responsive means, and a meter for and connected with each said light-responsive element, whereby said headlight beam pattern-locating means constitutes means for directing the center of the beam toward the said beam-intensity light-responsive means.

10. A testing apparatus for headlights, comprising supporting means for temporarily and removably mounting a headlight to be tested fixed with respect thereto, said supporting means having a fixed pivotal center about which said supporting means is movable and with respect to which said headlight is movable by moving the supporting means about said pivotal center, a tunnel into which the beam of the headlight is directed, said tunnel being fixed in its relation to said fixed pivotal center of the supporting means, a beam-intensity light-responsive means at the far end of the tunnel having means for indicating intensity of light incident thereon, a pattern-locating means in said tunnel in advance of said beam-intensity light-responsive means, said pattern-locating means comprising a group of light-responsive elements fixed with respect to each other and mounted for movement as a group into and out of the path of the headlight beam and arranged so that when in the path of the headlight beam they receive equal quantities of light when the center of the beam is directed toward the center of said group, said beam-intensity light-responsive means at the far end of the tunnel being positioned to receive the center of the beam from the headlight with said headlight at the same position at which set when said center of the beam is directed toward the center of the group of light-responsive elements forming the pattern-locating means, and means for indicating the relative intensity of light incident upon each of said light responsive elements of the group.

JAMES H. GREEN.